United States Patent
Taneja et al.

(10) Patent No.: US 7,848,570 B2
(45) Date of Patent: Dec. 7, 2010

(54) MEMORY REDUCTION TECHNIQUE FOR STATISTICS ACCUMULATION AND PROCESSING

(75) Inventors: Amit Taneja, Delhi (IN); Mahesh Chandra, Delhi (IN)

(73) Assignee: STMicroelectronics Pvt. Ltd., Greater Noida (IN)

( * ) Notice: Subject to any disclaimer, the term of this patent is extended or adjusted under 35 U.S.C. 154(b) by 1028 days.

(21) Appl. No.: 11/638,320

(22) Filed: Dec. 13, 2006

(65) Prior Publication Data

US 2007/0168621 A1 Jul. 19, 2007

(30) Foreign Application Priority Data

Dec. 30, 2005 (IN) .................. 3552/DEL/2005

(51) Int. Cl.
*G06K 9/00* (2006.01)

(52) U.S. Cl. ..................................... 382/168

(58) Field of Classification Search ................. 382/168, 382/170, 171
See application file for complete search history.

(56) References Cited

U.S. PATENT DOCUMENTS 5,799,311 A * 8/1998 Agrawal et al. .................. 1/1

* cited by examiner

*Primary Examiner*—Phuoc Tran
(74) *Attorney, Agent, or Firm*—Gardere Wynne Sewell LLP

(57) ABSTRACT

To provide a memory efficient method and system for statistical data accumulation and processing, data is divided into multiple data zones and divided into subgroups of memories. A separate memory bin is assigned for each of the subgroups, and this memory bin is shared between various two data zones in each subgroup for processing and accumulation. In this scheme, the histogram data in each location of the separate memory bin for the previously accumulated data zones is processed before updating the stored value for the data zone requiring data accumulation.

15 Claims, 10 Drawing Sheets

| Zone 1 | | | | Zone2 | | | | Zone 3 | | | | Zone4 | | | |
|---|---|---|---|---|---|---|---|---|---|---|---|---|---|---|---|
| 13 | 10 | 19 | 11 | 19 | 17 | 11 | 11 | 14 | 12 | 19 | 14 | 13 | 14 | 18 | 16 |
| 17 | 15 | 11 | 16 | 20 | 16 | 20 | 15 | 17 | 17 | 19 | 14 | 18 | 10 | 11 | 13 |
| 18 | 17 | 16 | 18 | 10 | 20 | 14 | 17 | 11 | 15 | 14 | 14 | 17 | 18 | 20 | 12 |
| 12 | 17 | 14 | 18 | 18 | 13 | 13 | 11 | 16 | 20 | 19 | 13 | 17 | 14 | 17 | 10 |

Figure-3

| Zone 1 Histogram | | Zone 2 Histogram | | Zone 3 Histogram | | Zone 4 Histogram | |
|---|---|---|---|---|---|---|---|
| Pixel Range | No of Pixels | Pixel Range | No of Pixels | Pixel Range | No of Pixels | Pixel Range | No of Pixels |
| 10 | 1 | 10 | 1 | 10 | 0 | 10 | 2 |
| 11 | 2 | 11 | 3 | 11 | 1 | 11 | 1 |
| 12 | 1 | 12 | 0 | 12 | 1 | 12 | 1 |
| 13 | 1 | 13 | 2 | 13 | 1 | 13 | 2 |
| 14 | 1 | 14 | 1 | 14 | 5 | 14 | 2 |
| 15 | 1 | 15 | 1 | 15 | 1 | 15 | 0 |
| 16 | 2 | 16 | 1 | 16 | 1 | 16 | 1 |
| 17 | 3 | 17 | 2 | 17 | 2 | 17 | 3 |
| 18 | 3 | 18 | 1 | 18 | 0 | 18 | 3 |
| 19 | 1 | 19 | 1 | 19 | 3 | 19 | 0 |
| 20 | 0 | 20 | 3 | 20 | 1 | 20 | 1 |

Use these gaps for processing

MEMORY REDUCTION TECHNIQUE FOR STATISTICS ACCUMULATION AND PROCESSING

PRIORITY CLAIM

The present application claims priority from Indian Application for Patent No. 3552/Del/2005 filed as a provisional application on Dec. 30, 2005, with a complete specification filed on Nov. 21, 2006, the disclosures of which are hereby incorporated by reference.

BACKGROUND OF THE INVENTION

1. Technical Field of the Invention

The present invention relates to a memory reduction technique for statistics accumulation and processing. More particularly, the instant invention relates to memory reduction for data storage and processing for histograms used for image processing applications.

2. Description of Related Art

Statistics accumulation and processing is an important step in image processing applications, which perform different modifications on images and video frame. Different primary color combinations such as Red, Green, Blue (RGB) or Cyan, Magenta, Yellow, and Black (CMYK) are used for representing every imaginable color in an image or a video frame. Therefore, considerable memory is required for storing statistics for each pixel in an image or a video frame.

These statistics include a histogram representing for each of the color in RGB or any other color configuration. A histogram is a simple graph that displays distribution of the brightness levels contained in the scene, from the darkest to the brightest. FIG. 1 illustrates an example of a histogram. These values are arrayed across the bottom of the graph from left (darkest) to right (brightest). The vertical axis (the height of points on the graph) shows how much of the image is found at any particular brightness level. Histograms are the basis for numerous spatial domain processing techniques. Histogram manipulation can be used effectively for image enhancement. Information inherent in histograms is quite useful in other image processing applications, such as image compression and segmentation.

The histogram computation is accomplished by counting each distinct pixel value in the image. For 8-bit pixels the size of the array is 256 (0-255). Parse the image and increment each array element corresponding to each pixel processed. This is shown with the help of an example in FIG. 2. The rectangular mosaic pattern on the left contains 40 tiles in a 10×4 grid. These are sorted by color and stacked up accordingly. The higher the pile, the more tiles of that color in the mosaic. The resulting histogram would represent the color distribution of the mosaic. The same has been illustrated with numerical values pixels associated with in FIG. 3. The resulting histogram is shown in FIG. 4.

FIG. 5 illustrates a raster graphics image. A raster graphics image, digital image, or bitmap, is a data file or structure representing a generally rectangular grid of pixels, or points of color, on a computer monitor, paper, or other display device. The color of each pixel is individually defined; images in the RGB color space, for instance, often consist of colored pixels defined by three bytes one byte each for red, green and blue. A colored raster image (or pixmap) will usually have pixels with between one and eight bits for each of the red, green, and blue components. Bayer color filter array is a popular format for digital acquisition of color images. The pattern of the Bayer color filters is shown in FIG. 6. Half of the total number of pixels are green (G), while a quarter of the total number is assigned to both red (R) and blue (B). The Bayer Image data Frame from a sensor is received one pixel per clock, in raster format.

Figure 7:
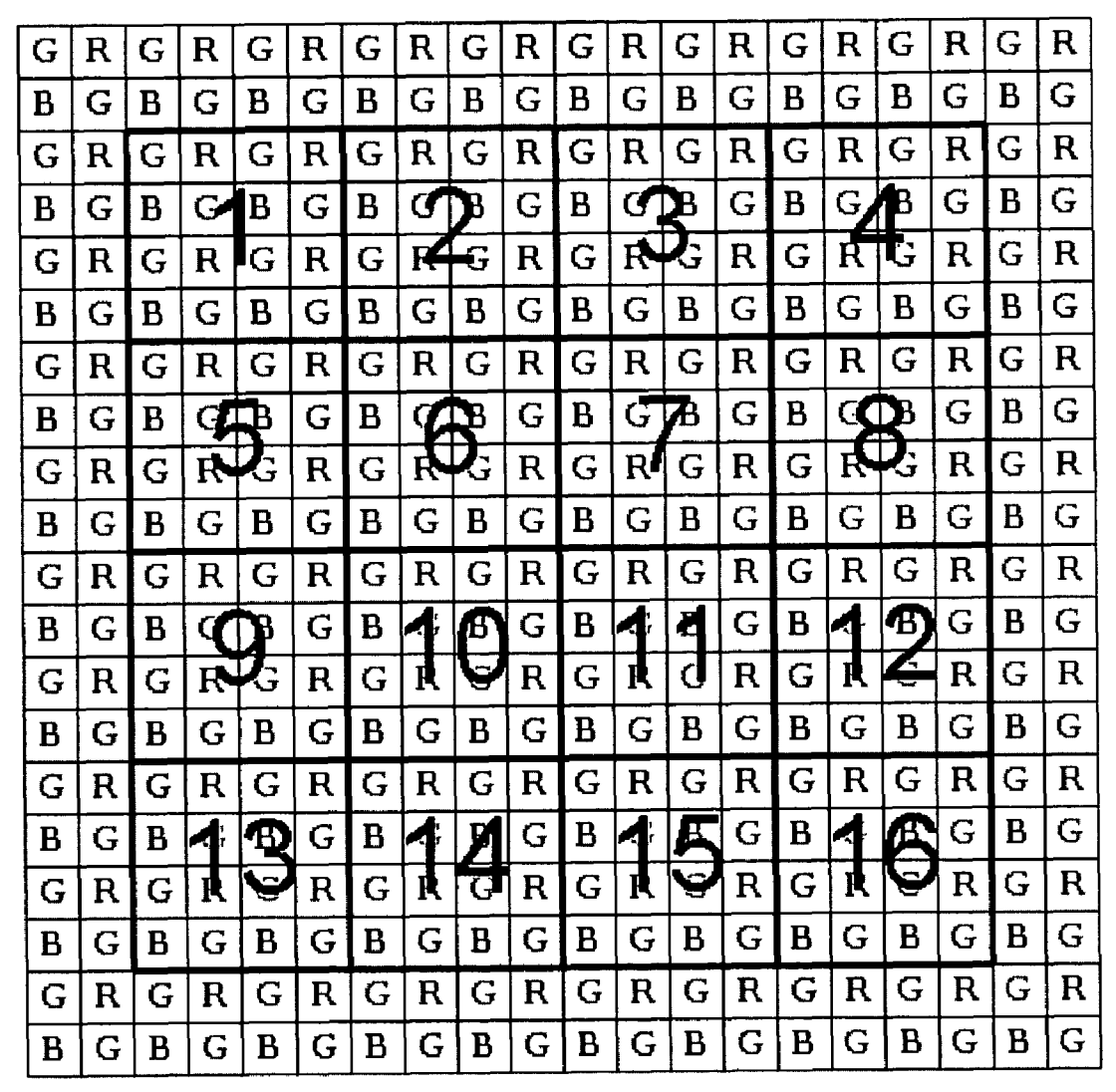

FIG. 7 shows an input image requiring statistics accumulation and processing. An Input image pattern is subdivided into N equally sized blocks. For the purpose of illustration, assume: N is fixed to 16 and all zones are equal in size and juxtaposed, thus leading to a 4×4 grid overlaid on the input image data. FIG. 8 shows the image pattern and the overlaid grid and accumulated histograms. For determining the image quality, the histograms are accumulated for each of the zones in the grid. After the histogram has been accumulated, each bin is read and processed further.

There are several problems associated with such imaging schemes which are used in various imaging and video applications. In video applications, the collected samples of subsequent image frames are entirely independent (except due to similarities between the actual data frames) thus the sample and store hardware does not require (and should not have) any persistent state between image frames. For the video applications, the incoming image frames are continuous and hence, precaution needs to be taken that the stored information is not overwritten before it is processed.

There are three schemes currently used for memory implementations for preventing the data loss in such applications. In the first scheme, an independent memory is used for storing statistical data for each zone. This scheme eliminates data loss, but increases the memory requirement as there is no re-use within one frame. FIG. 9 illustrates the first scheme used for collecting data. In the scheme, sixteen independent Histogram Collection Bins are used, one for each zone, for collecting data for each zone.

Another way could be to reuse bins for different zones by limiting the accumulation to fewer pixels. Instead, the processing is done in the inter-zonal time gap, where no accumulation is being done. This scenario is depicted in FIG. 10. This reduces the memory requirements, as only four bins are used instead of sixteen, but also impacts the accuracy of collected statistics as it is not representative of all the data elements in the zone.

In third scheme, the bins are reused for histogram accumulation. In this scheme, eight bins are used instead of sixteen; hence there is a memory reduction. Also, since there is no reduction in the zone size, there is no associated loss of accuracy as with the second scheme. The BINS numbered 1, 2, 3, and 4 are processed while BINS 5, 6, 7, and 8 are used for accumulation and vice versa. This scenario is depicted in FIG. 11. Although the scheme uses requires less memory bins than the first scheme, it still requires more memory bins for data accumulation when compared to the second scheme. Hence, the scheme has higher memory requirement in comparison to the conventional data accumulation schemes.

Hence, there is a need for a memory reduction technique that does not result in data loss. Also, there is a need for a technique that minimizes the memory requirement for statistics accumulation and processing. There is also need for a data statistics accumulation and processing system which reduces memory requirement and eliminates data loss.

SUMMARY OF THE INVENTION

To obviate the drawbacks of the prior art an embodiment of the instant invention provides a memory reduction technique for statistics accumulation and processing. Preferably, this memory reduction technique does not result in data loss for statistics accumulation, and minimizes the memory requirement for statistics accumulation and processing. An embodiment further concerns a data statistics accumulation and processing system which reduces memory requirement and data loss at the same time.

The instant invention relates to a memory efficient method and system for statistical data accumulation and processing comprising the steps of partitioning of image data into a set of enumerated data zones; partitioning of said set of enumerated data zones into exclusive subsets; assigning a separate memory bin for each of said exclusive subsets; initially assigning a first of enumerated data zones in each of exclusive subsets for histogram data accumulation; collecting histogram data representing number of instances of a pixel values in predetermined memory locations in each of separate memory bins; assigning next of the enumerated data zones from each of said exclusive subsets for histogram data collection and processing; finding a required memory location corresponding to pixel value for storage of histogram data; processing stored value in the required memory location in the event of stored value not representing histogram data for data zone requiring histogram data accumulation; updating the stored value in the required memory location; repeating steps of finding, processing and updating for all data in each of the data zones in each of said exclusive subset; finally updating the stored values in memory locations if the stored values are not representing histogram data for data zone requiring histogram data accumulation; assigning next of the enumerated data zones from each of exclusive subsets for histogram data accumulation; repeating steps of repeating and assigning until completion of said statistical data accumulation and processing for entire set of enumerated data zones.

In an embodiment, a method comprises: partitioning image data into a plurality of data zones, each zone comprising a plurality of image data points; providing a plurality of memory bins, less in number than the number of data zones; grouping the plurality of data zones into a plurality of groups, each group including a plurality of data zones, and each group of data zones being assigned to one of the plurality of memory bins; collecting statistical information relating to the image data of a previous zone in a given group; storing that collected statistical information for the previous zone image data in a memory bin corresponding to that given group; sequentially reading the collected previous zone statistical information from memory locations in the memory bin corresponding to that given group; collecting statistical information relating to the image data of a next zone in the given group; sequentially storing that collected statistical information for next zone image data in the memory bin corresponding to that given group at memory locations; wherein sequentially reading and sequentially storing are coordinated such that when previous zone statistical information is read from a certain memory location in the memory bin, next zone statistical information is immediately stored in that certain memory location.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 3 illustrates histogram computation for a 64-pixel example image, with numerical values assigned to pixel color attribute;

FIG. 4 illustrates the resultant histogram for example image in FIG. 3;

FIG. 7 illustrates an input image requiring statistics accumulation and processing;

Figure 11:
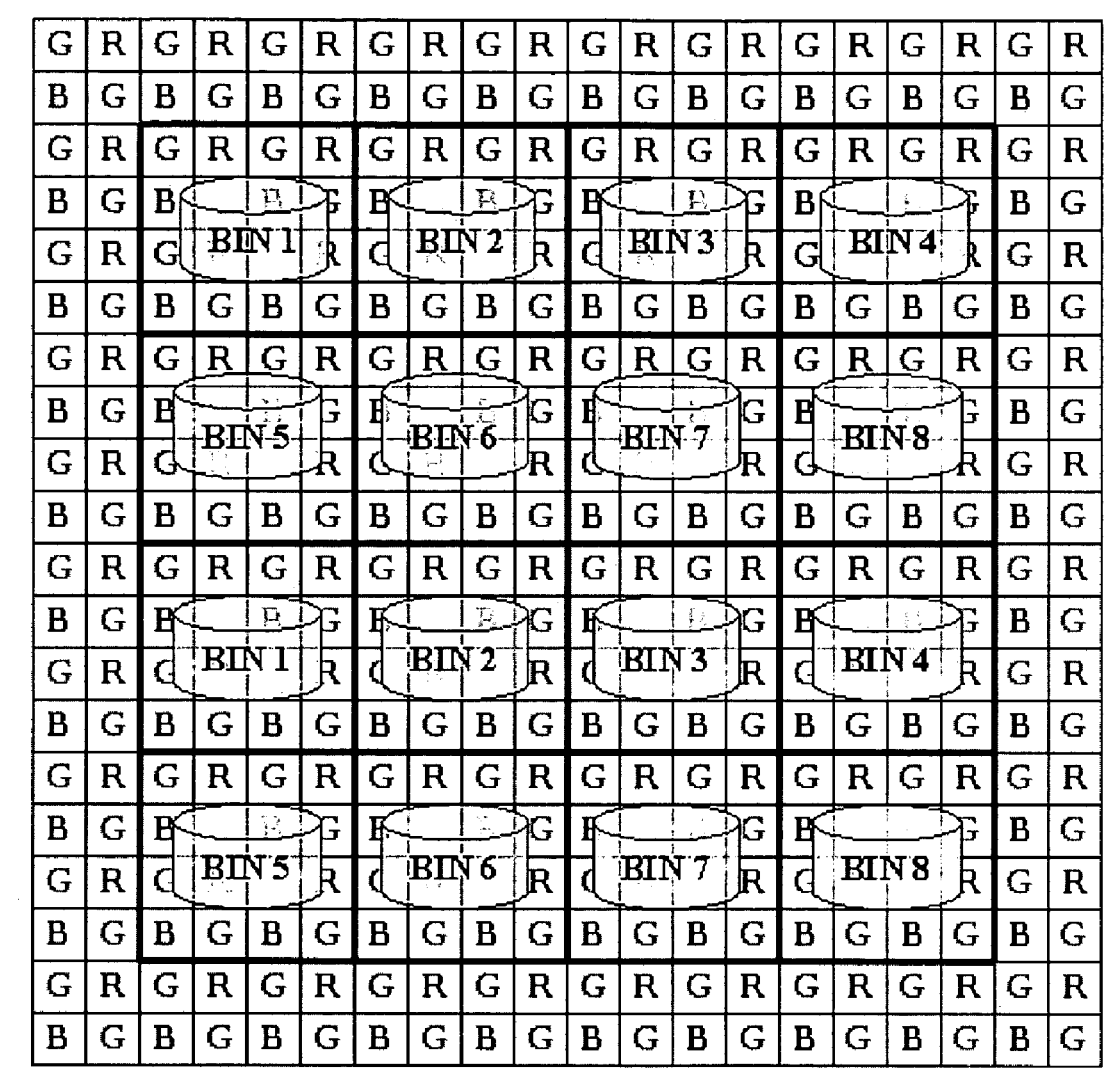

FIG. 11 illustrates the third scheme for collecting statistical data;

FIG. 12 illustrates the proposed scheme for collecting statistical data in accordance with the present invention.

DETAILED DESCRIPTION OF THE DRAWINGS

Figure 12:
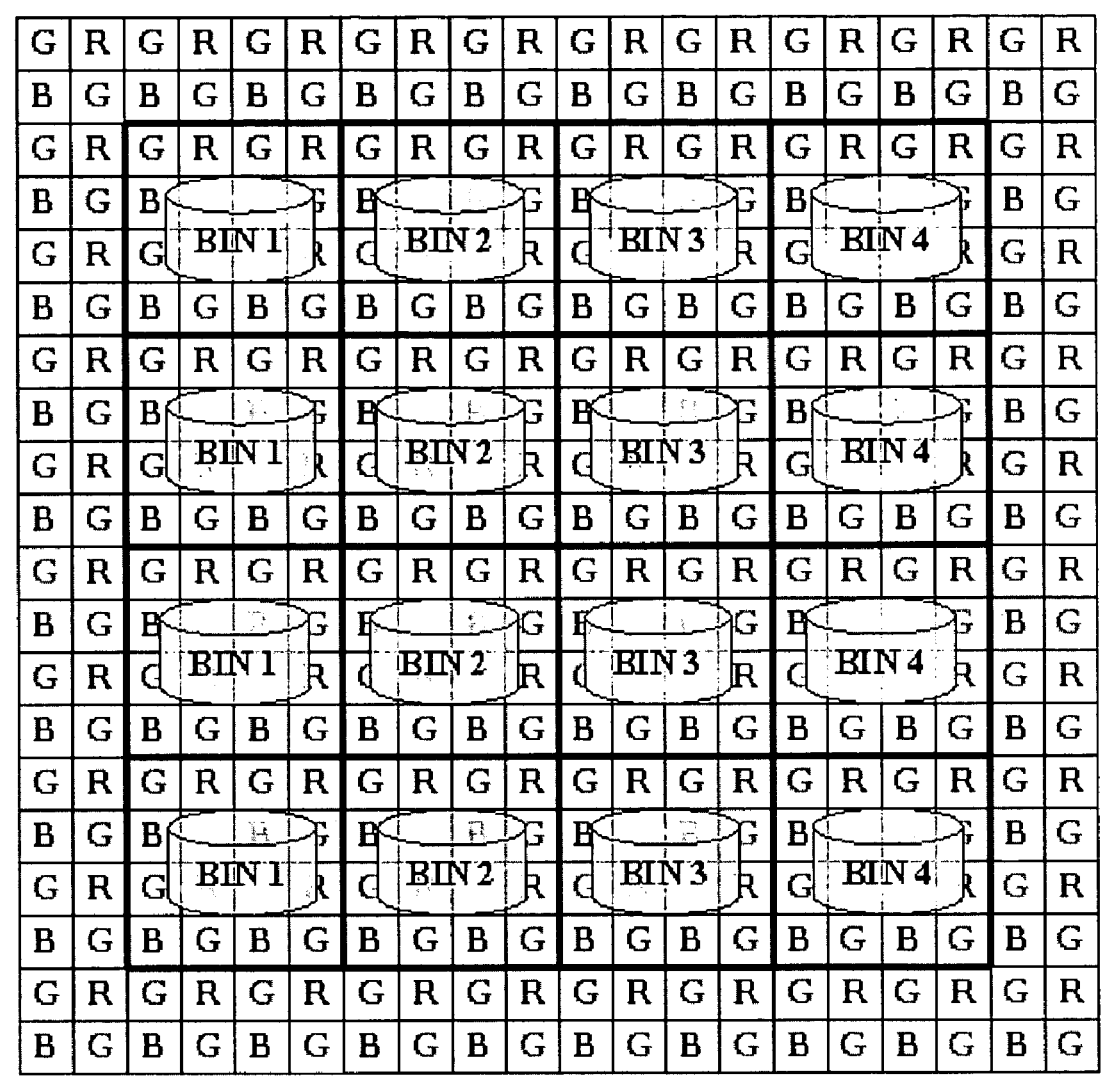

The instant invention provides a memory reduction technique for statistics accumulation processing without any data loss from continuous data stream. In this technique, the number of memory bins required for statistics accumulation and data processing is minimized without resulting in data loss. The technique requires alteration in memory organization by using a "process before store" mechanism. This allows reuse of one BIN to store samples for two data zones concurrently. This results in minimization of memory requirements for the statistics accumulation and processing applications. For instance, in a 4×4 grid overlaid for an image illustrated in FIG. 12, BIN 1 is used for simultaneously storing data for zone 1 and zone 5, zone 5 and zone 9, and, zone 9 and zone 13. Similarly data is concurrently stored for two zones in other BINS. At the same time, the zone data size is not reduced and hence there is no cut down on the number of data samples accumulated and accuracy of statistics is high.

The instant invention relates to processing of statistical data stored in a histogram and is henceforth described in the embodiment in relation to the data accumulation for a digital image. Histogram of a digital image with gray levels in the range [0, L−1] is a discrete function $h(r_k)=n_k$, where $r_k$ is the kth gray level and $n_k$ is the number of pixels in the image having gray level $r_k$. In a typical scenario the count $n_k$ is maintained in $r_k$ memory location. Hence each memory location represents a particular pixel value $r_k$. Each memory location representing a $r_k$ is used for storing the number of pixels $n_k$ in a given zone. Histograms lend themselves to easy hardware implementations, thus making them a popular tool for real-time image processing.

Figure 1:
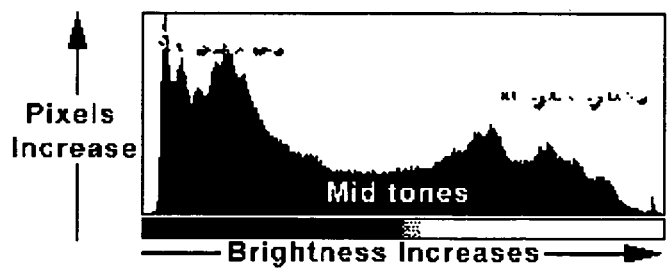
FIG. 1 illustrates an example for a histogram.
Figure 2:
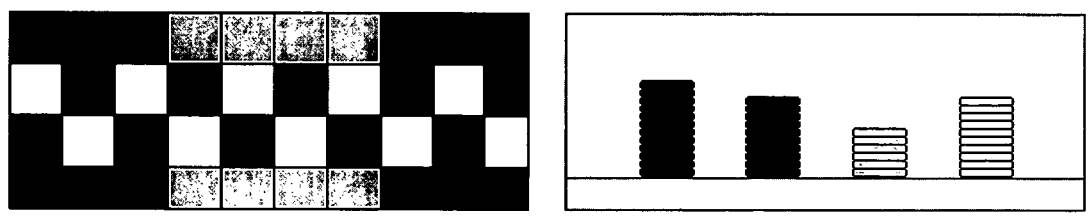
FIG. 2 illustrates histogram computation for a 40-pixel example image.
Figure 5:
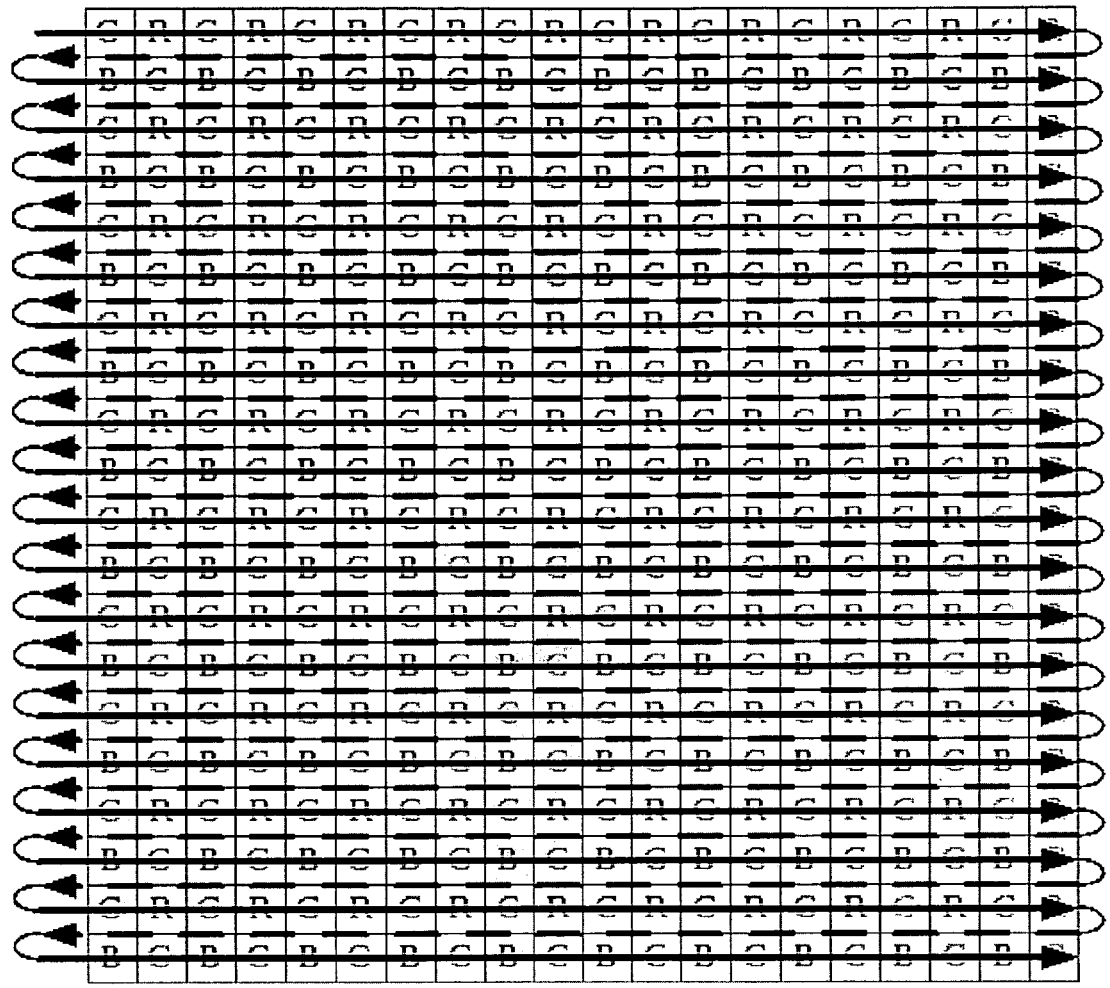
FIG. 5 illustrates a raster graphics image.
Figure 6:
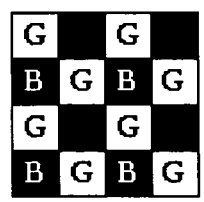
FIG. 6 illustrates a Bayer Filter array pattern.
Figure 8:
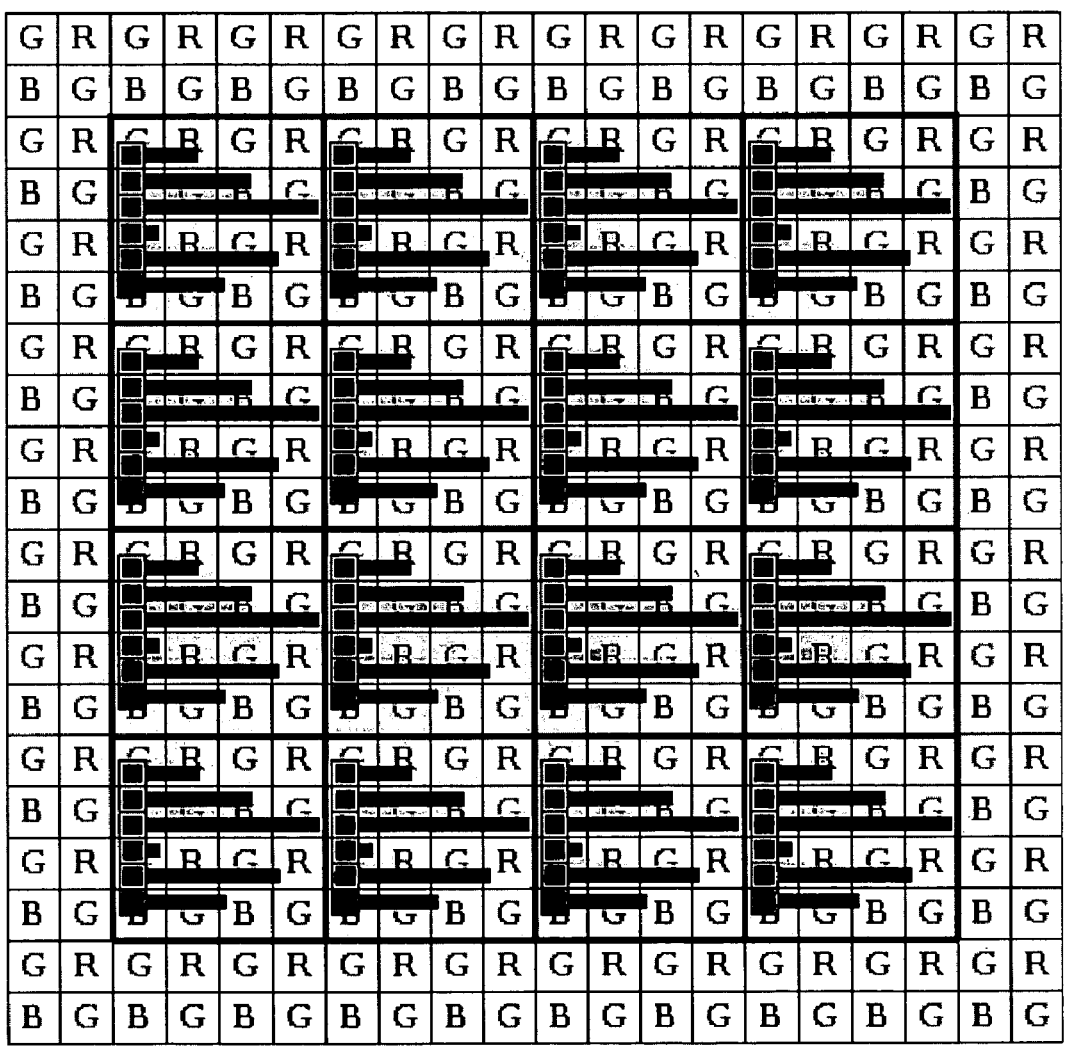
FIG. 8 illustrates the histograms accumulated for each of the zones in a grid on an image.
Figure 9:
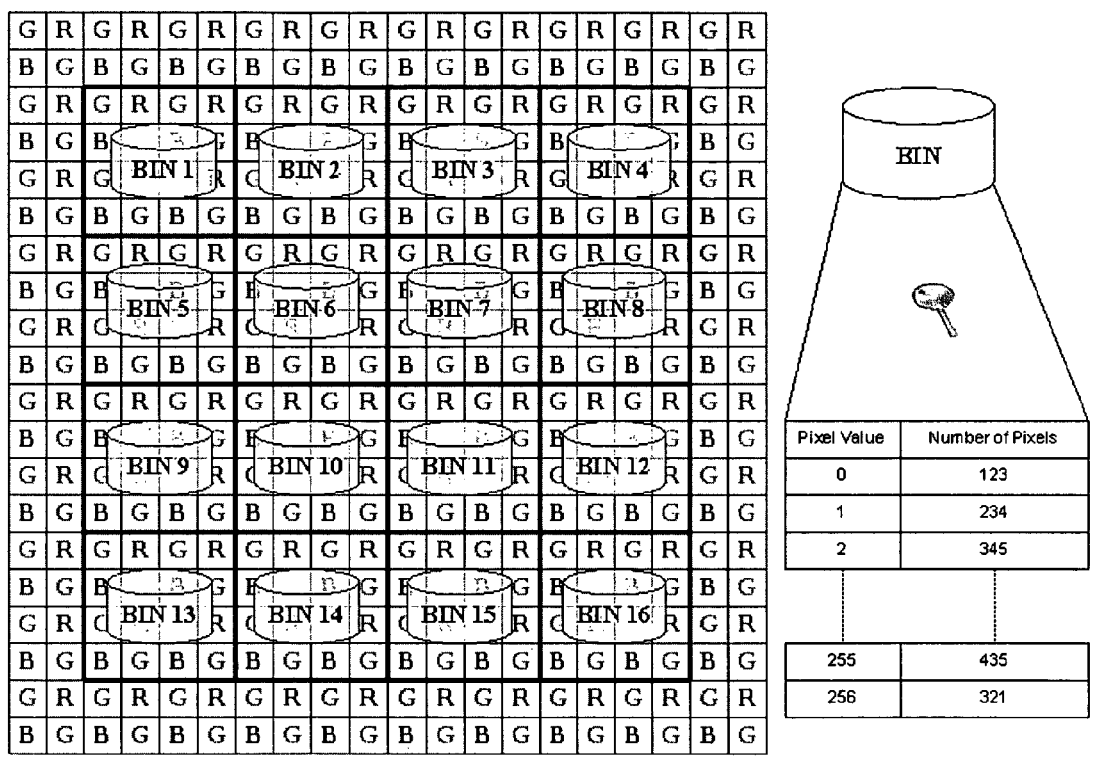
FIG. 9 illustrates the first scheme for collecting statistical data.
Figure 10:
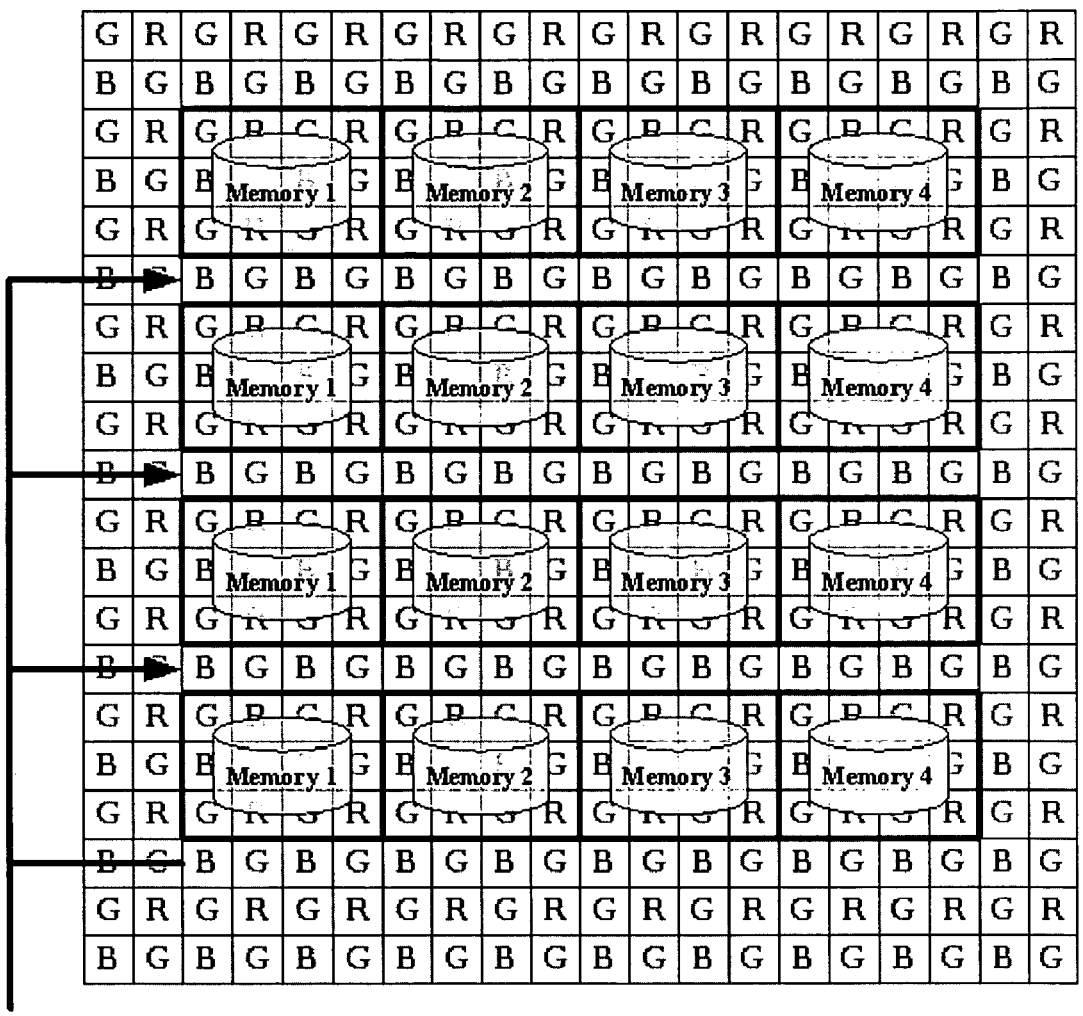
FIG. 10 illustrates the second scheme for collecting statistical data.
Figure 13:
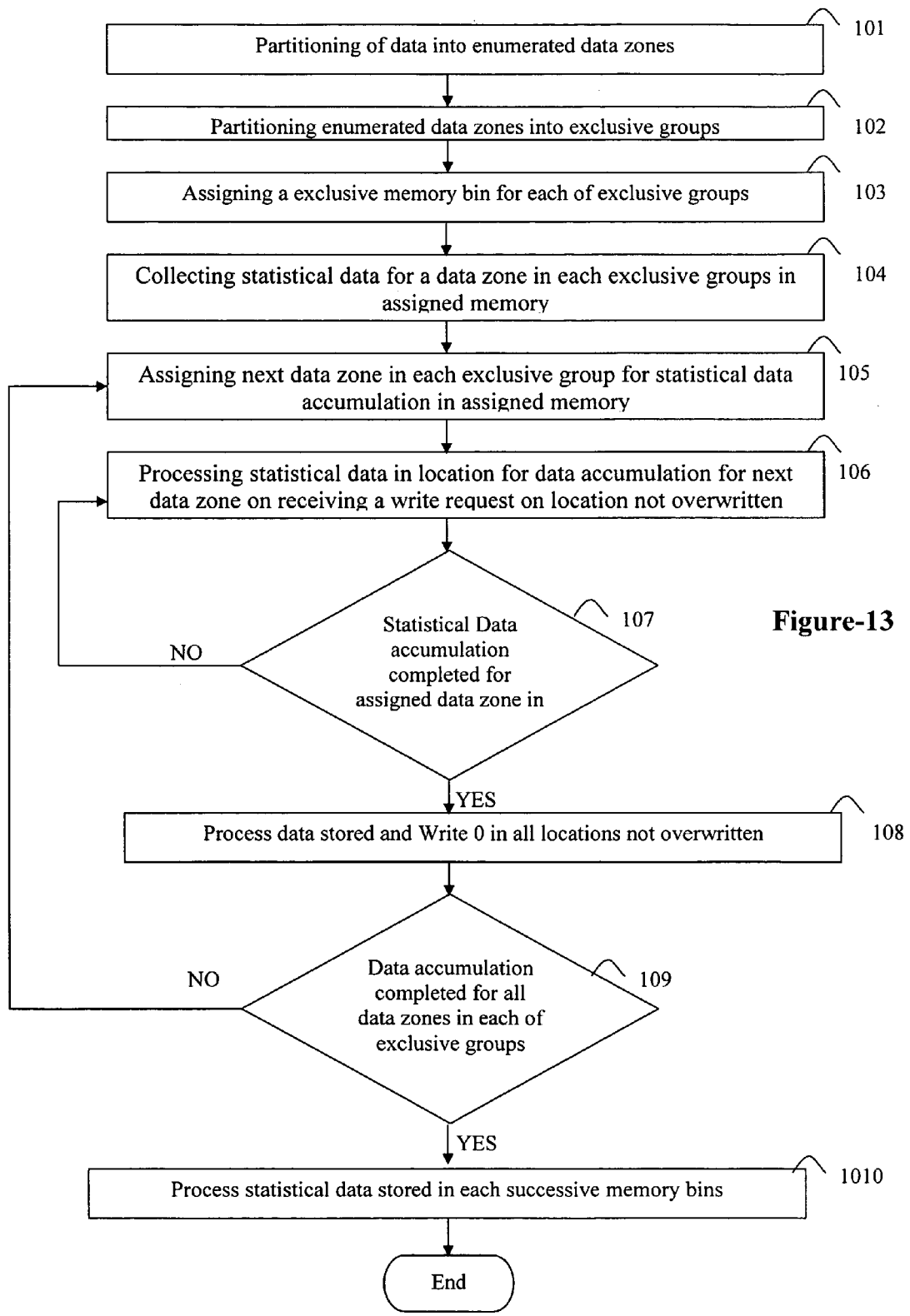
FIG. 13 illustrates the flowchart of operation of method in accordance with the present invention.

FIG. 13 describes the flowchart of operation of the method used for memory reduction technique. The digital image is first divided into data zones as described in the background 101. A separate memory bin is assigned for each exclusive subset for data zones 102 and 103. The pixels in each of the zones are initially sampled and stored using the process described above in exclusive memory BINS 1-4, for corresponding non-sharing zones 1-4 respectively 104. This statistical data collection may take place in parallel or sequential operating mode. After data is collected for each of the zones and stored in the corresponding memory bins, the memory bins are shared for the purpose of data collection with other zones. The data accumulation for next data zone in each enumerated order of the exclusive subsets is initiated. Reference 105 for instance in next step in the preferred embodiment, zone 1 and zone 5, zone 2 and zone 6, zone 3 and zone 7, and zone 4 and zone 8 share the corresponding memory BIN 1-4.

The concept of sharing involves processing values $n_k$ of the histogram for the previous zone's collected data before writing the values $n_k$ of the histogram for the present zone's collected data 106. In order to share the memory bin, the data is first collected/sampled from a particular location/pixel in the zones 1 to 4. For every incoming pixel in the next zones 5 to 8, the $r_k$ of the recently collected data is determined, and the previous value $n_k$ stored corresponding to $r_k$ is subsequently read out and processed for desired results. After the value of the stored $n_k$ has been read out, the value $n_k$ for next sharing zone is written in the same location. The system is designed so the processing of data is completed before the data collection for next location/pixel occurs. Hence by the end of data collection for the next sharing zone, the histogram information of previous zones 1-4 is overwritten by the histogram information of the next sharing zones 5-8 respectively 107. The memory locations which are not overwritten are updated by processing the stored values and writing zero value in the memory locations 108. The process is repeated for next sharing zones 9-12 where data is first processed for each location of the zones 5-8 before collecting the statistical information from data for corresponding locations in zones 9-12 respectively 109. The steps 105-109 are repeated until statistical data is collected and processed for all zones in the image 1010. Same memory bin can be reused, if and only if, the histogram information is not required after it has been processed.

The benefit of collecting large number of samples is increased accuracy of the gathered statistics. The downturn of a larger memory size required to store these samples is overcome as memory bins are shared. Gathering fewer samples is not required and as the processing is completed while the data is written for a particular pixel, there is no data loss in the statistics accumulation and processing. This technique does reduce the memory size and also maintains the accuracy of collected statistics, as valid samples are not discarded. Also, by changing the processed zone dynamically and processing two zones simultaneously, the processing is completed earlier than the occurrence of "overwrite" condition, thus preventing data loss.

All documents cited in the description are incorporated herein by reference. The present invention is not to be limited in scope by the specific embodiments and examples which are intended as illustrations of a number of aspects of the invention and any embodiments which are functionally equivalent are within the scope of this invention. Those skilled in the art will know, or be able to ascertain using no more than routine experimentation, many equivalents to the specific embodiments of the invention described herein. These and all other equivalents are intended to be encompassed by the following claims.

What is claimed is:

1. A memory efficient method for statistical data accumulation and processing comprising:
   partitioning data into a set of enumerated data zones, wherein said data represents a digital image;
   partitioning said set of enumerated data zones into exclusive subsets;
   assigning an exclusive memory bin for each of said exclusive subsets;
   initially assigning a first of enumerated data zones in each of the exclusive subsets as a current data zone;
   collecting statistical data representing number of instances of a property value for said current data zones in predetermined memory locations in said exclusive memory bins;
   assigning a next of the enumerated data zones from each of said exclusive subsets as said current data zones;
   finding a required memory location corresponding to said property value for storage of said statistical data in said current data zone;
   processing a stored value in said required memory location in the event of said stored value not representing said statistical data for said current data zone;
   updating the stored value in said required memory location;
   repeating said steps of finding, processing and updating for all data in said current data zones in each of said exclusive subset;
   finally updating the stored values in memory locations in the event of stored values not representing said statistical data for said current data zone;
   assigning next of the enumerated data zones from each of said exclusive subsets as said current data zones;
   repeating said steps of repeating and assigning for said current data zone until completion of said statistical data accumulation and processing for said set of enumerated data zones.

2. The method as claimed in claim 1, wherein said property value represents a pixel value for said digital image.

3. The method as claimed in claim 2, wherein said statistical data represents a histogram of said pixel values.

4. The method as claimed in claim 2, wherein each of said predetermined memory locations in said exclusive memory bins is used for storing number of instances of said pixel value in said current zone in said image.

5. The method as claimed in claim 2, wherein said stored value is the number of instances of said pixel value collected until said step of updating in said current zone.

6. The method as claimed in claim 1, wherein each of said predetermined locations in each of said exclusive memory bins is a separate memory location.

7. The method as claimed in claim 1, wherein said step of updating comprises:
   storing a value of one in said required memory location in the event of said stored value not representing said statistical data for said current data zone; and
   incrementing the stored value in the event of said stored value representing said statistical data for said next block.

8. The method as claimed in claim 1, wherein said step of updating comprises:
   processing the stored value in the memory location; and
   storing a value of one in said required memory location in the event of said stored value not representing said statistical data for said current data zone.

9. A memory efficient method for statistical data accumulation and processing, comprising:
   partitioning data into a set of enumerated data zones;
   partitioning said set of enumerated data zones into exclusive subsets;
   assigning an exclusive memory bin for each of said exclusive subsets;
   initially assigning a first of enumerated data zones in each of the exclusive subsets as a current data zone;
   collecting statistical data representing number of instances of a property value for said current data zones in predetermined memory locations in said exclusive memory bins;

assigning a next of the enumerated data zones from each of said exclusive subsets as said current data zones;

finding a required memory location corresponding to said property value for storage of said statistical data in said current data zone;

processing a stored value in said required memory location in the event of said stored value not representing said statistical data for said current data zone;

updating the stored value in said required memory location;

repeating said steps of finding, processing and updating for all data in said current data zones in each of said exclusive subset;

finally updating the stored values in memory locations in the event of stored values not representing said statistical data for said current data zone;

assigning next of the enumerated data zones from each of said exclusive subsets as said current data zones;

repeating said steps of repeating and assigning for said current data zone until completion of said statistical data accumulation and processing for said set of enumerated data zones, wherein said processing of said statistical data includes image enhancement.

10. A memory efficient system for statistical data accumulation and processing comprising:

a plurality of exclusive memory bins for statistical data accumulation for data;

means for partitioning data into exclusive subsets of enumerated data zones and assigning said exclusive subsets to said exclusive memories;

at least one assigner for assigning one of said enumerated data zones in each of said exclusive subsets as a current data zones;

at least one data accumulator for collecting statistical data representing number of instances of a property value for said current data zones in predetermined memory locations in said exclusive memory bins; and at least one data processor for processing stored values in particular memory location of said exclusive memory bins before collecting said statistical data for said current data zones in said particular memory location.

11. A method comprising:

(a) partitioning image data into a plurality of data zones, each zone comprising a plurality of image data points;

(b) providing a plurality of memory bins, less in number than the number of data zones;

(c) grouping the plurality of data zones into a plurality of groups, each group including a plurality of data zones, and each group of data zones being assigned to one of the plurality of memory bins;

(d) collecting statistical information relating to the image data of a previous zone in a given group;

(e) storing that collected statistical information for the previous zone image data in a memory bin corresponding to that given group;

(f) sequentially reading the collected previous zone statistical information from memory locations in the memory bin corresponding to that given group;

(g) collecting statistical information relating to the image data of a next zone in the given group;

(h) sequentially storing that collected statistical information for next zone image data in the memory bin corresponding to that given group at memory locations;

wherein sequentially reading and sequentially storing are coordinated such that when previous zone statistical information is read from a certain memory location in the memory bin, next zone statistical information is immediately stored in that certain memory location.

12. The method of claim 11 further including:

(i) considering the next zone statistical information to be previous zone statistical information; and (j) repeating steps (f) through (i).

13. The method of claim 11 wherein sequentially reading and sequentially storing are coordinated such that when previous zone statistical information is read from a certain memory location in the memory bin, next zone statistical information overwrites the previous zone statistical information in that certain memory location.

14. The method of claim 11 wherein sequentially reading and sequentially storing are coordinated such that each read of previous zone statistical information from a certain memory location in the memory bin is accompanied with a storing of next zone statistical information in that certain memory location.

15. The method of claim 11 wherein sequentially reading and sequentially storing are coordinated such that shared use is made of the memory bin for simultaneously storing some statistical information for both the previous zone and the next zone.

* * * * *